(12) United States Patent
Yamada

(10) Patent No.: US 10,877,394 B2
(45) Date of Patent: Dec. 29, 2020

(54) IMAGE FORMING APPARATUS CAPABLE OF PERFORMING GRADATION CORRECTION, METHOD OF CONTROLLING SAME, AND STORAGE MEDIUM

(71) Applicant: CANON KABUSHIKI KAISHA, Tokyo (JP)

(72) Inventor: Michihiko Yamada, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/597,161

(22) Filed: Oct. 9, 2019

(65) Prior Publication Data
US 2020/0041929 A1 Feb. 6, 2020

Related U.S. Application Data

(63) Continuation of application No. 16/129,158, filed on Sep. 12, 2018, now Pat. No. 10,488,784.

(30) Foreign Application Priority Data

Sep. 19, 2017 (JP) ................................ 2017-179014

(51) Int. Cl.
*G03G 15/08* (2006.01)
*G03G 15/01* (2006.01)
(Continued)

(52) U.S. Cl.
CPC ..... *G03G 15/0808* (2013.01); *G03G 15/0136* (2013.01); *G03G 15/0806* (2013.01);
(Continued)

(58) Field of Classification Search
None
See application file for complete search history.

(56) References Cited

U.S. PATENT DOCUMENTS 6,516,162 B2 2/2003 Ino
8,391,737 B2 * 3/2013 Ozeki ................ G03G 15/0266
399/55
2011/0026957 A1 2/2011 Ozeki

FOREIGN PATENT DOCUMENTS

JP 2009230135 A 10/2009

OTHER PUBLICATIONS

Notice of Allowance issued in U.S. Appl. No. 16/129,158 dated Jul. 10, 2019.

* cited by examiner

*Primary Examiner* — Victor Verbitsky
(74) *Attorney, Agent, or Firm* — Rossi, Kimms & McDowell LLP

(57) ABSTRACT

First correction data for use in a first printing mode is generated by image density measurement in the first printing mode, and second correction data for use in a second printing mode, which is different from the first printing mode in peripheral speed ratio of a developing roller to a photosensitive drum, is generated by image density measurement in the second printing mode. First processing for generating first and second correction data for the first and second printing modes, respectively, by density measurement, or second processing for generating the first correction data by density measurement and generating the second correction data using the generated first correction data and a difference in image density between the first printing mode and the second printing mode is executed. The first processing is executed when a predetermined condition is satisfied.

21 Claims, 12 Drawing Sheets

(51) Int. Cl.
*G06F 3/0482* (2013.01)
*G03G 15/00* (2006.01)
*G03G 15/04* (2006.01)

(52) U.S. Cl.
CPC ..... *G03G 15/5008* (2013.01); *G03G 15/5041* (2013.01); *G03G 15/55* (2013.01); *G06F 3/0482* (2013.01); *G03G 15/04027* (2013.01); *G03G 15/502* (2013.01)

FIG. 3
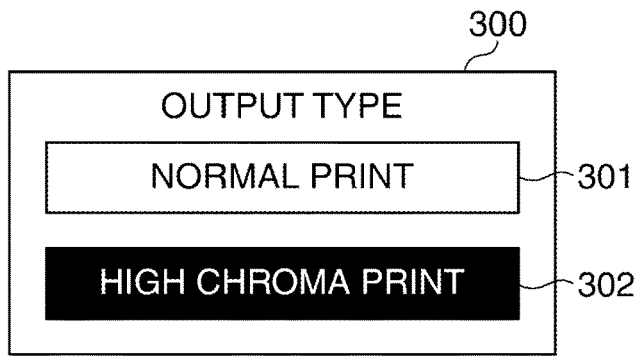
FIG. 4
| OUTPUT TYPE | PHOTOSENSITIVE DRUM | DEVELOPING ROLLER |
|---|---|---|
| NORMAL PRINT | 1/1 | 1/1 |
| HIGH CHROMA PRINT | 1/3 | 1/1 |
FIG. 5
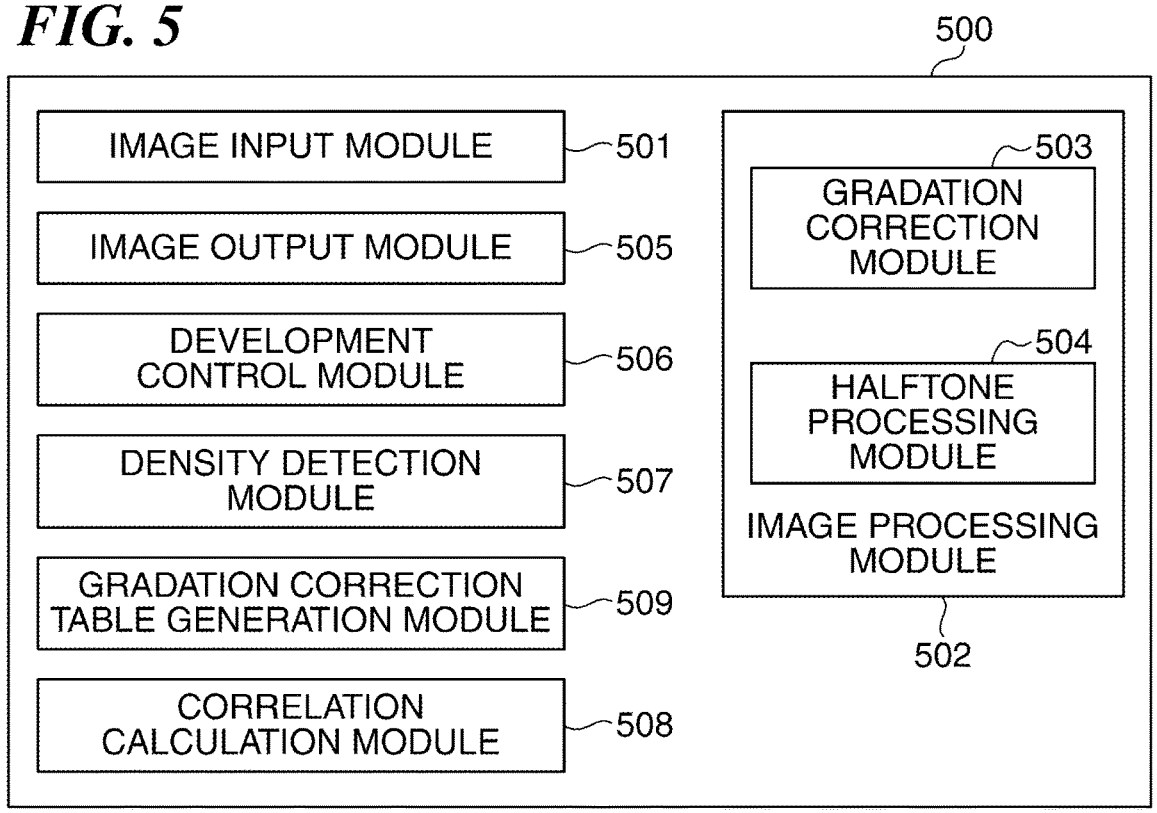

FIG. 19

| NUMBER OF OUTPUT SHEETS | GRADATION CORRECTION TYPE |
|---|---|
| 0 | COMPLETE CORRECTION |
| 1500 | NORMAL CORRECTION |
| 3000 | COMPLETE CORRECTION |
| 4500 | NORMAL CORRECTION |
| 6000 | COMPLETE CORRECTION |
| 7500 | NORMAL CORRECTION |
| 9000 | NORMAL CORRECTION |
| 10500 | NORMAL CORRECTION |
| 12000 | NORMAL CORRECTION |
| 13500 | NORMAL CORRECTION |
| 15000 | COMPLETE CORRECTION |
| 16500 | NORMAL CORRECTION |
| 18000 | NORMAL CORRECTION |
| 19500 | NORMAL CORRECTION |
| 21000 | COMPLETE CORRECTION |
| 22500 | NORMAL CORRECTION |
| 24000 | NORMAL CORRECTION |

IMAGE FORMING APPARATUS CAPABLE OF PERFORMING GRADATION CORRECTION, METHOD OF CONTROLLING SAME, AND STORAGE MEDIUM

BACKGROUND OF THE INVENTION

Field of the Invention

The present invention relates to an image forming apparatus that is capable of performing gradation correction, a method of controlling the same, and a storage medium.

Description of the Related Art

There has been known an MFP as an image forming apparatus having a normal printing mode and a high chroma printing mode that makes it possible to realize higher chroma printing than in the normal printing mode. In the normal printing mode, a photosensitive drum and a developing roller are rotated at respective rotational speeds having a predetermined ratio therebetween, toner is attached onto an electrostatic latent image formed on the photosensitive drum by the developing roller, and the toner is transferred from the photosensitive drum onto a transfer belt. On the other hand, in the high chroma printing mode, out of the photosensitive drum and the developing roller, the rotational speed of the photosensitive drum is made lower than in the normal printing mode to thereby increase the amount of toner attached to the photosensitive drum, whereby printed matter having high chroma is provided.

Incidentally, the MFP performs gradation correction to suppress a decrease in the density reproducibility of printed matter, caused by aging or the like of the MFP, and in the gradation correction, a gradation correction table is generated so as to make the density of printed matter close to a target density specified in advance. In a process for generating the gradation correction table, the MFP forms patch images including e.g. images of patches of C (cyan), M (magenta), Y (yellow), and K (black) on the transfer belt based on patch information stored in advance, and reads a toner density of each patch using a density detection sensor. The MFP generates a gradation correction table based on a difference between the detected toner density of each patch and the target density. The difference between the toner density of each patch and the target density is different depending on a printing mode, and hence the MFP generates different gradation correction tables associated with the normal printing mode and the high chroma printing mode, respectively. Although the MFP is required to periodically perform gradation correction, if the above-mentioned process for generating gradation correction tables is performed whenever gradation correction is performed, it takes time more than necessary. To cope with this, for example, it is envisaged to generate the gradation correction table associated with the high chroma printing mode (hereinafter referred to as the "high chroma gradation correction table") based on a conversion coefficient specified in advance at the time of factory shipment of the MFP, and the gradation correction table associated with the normal printing mode (hereinafter referred to as the "normal gradation correction table"), which is generated by the above-mentioned gradation correction table generation process (see e.g. Japanese Laid-Open Patent Publication (Kokai) No. 2009-230135). This makes it possible to generate the high chroma gradation correction table without performing the above-mentioned gradation correction table generation process, and further, it is possible to perform gradation correction with high accuracy, in a manner suited to each printing mode, while reducing the execution time of gradation correction.

However, the technique disclosed in Japanese Laid-Open Patent Publication (Kokai) No. 2009-230135 cannot always perform gradation correction with high accuracy while reducing the execution time of gradation correction. The differences between the normal gradation correction table and the high chroma gradation correction table vary with the use conditions of the MFP. For this reason, even when a high chroma gradation correction table is generated based on the conversion coefficient specified in advance at the time of factory shipment of the MFP, and gradation correction is performed using the generated high chroma gradation correction table, it is impossible to perform gradation correction with high accuracy. Further, with a view to suppressing lowering of the accuracy of gradation correction in the high chroma printing mode, if a high chroma gradation correction table is generated by performing the above-mentioned gradation correction table generation process whenever gradation correction is performed, the execution time of gradation correction is increased. That is, the conventional MFP cannot achieve both of reduction of the execution time of gradation correction and suppression of lowering of the accuracy of gradation correction.

SUMMARY OF THE INVENTION

The present invention provides an image forming apparatus that is capable of achieving both of reduction of the execution time of gradation correction and suppression of lowering of the accuracy of gradation correction, a method of controlling the same, and a storage medium.

In a first aspect of the present invention, there is provided an image forming apparatus that includes a photosensitive drum on which an electrostatic latent image is formed, and a developing roller which causes developer to attach to the photosensitive drum, and is capable of performing image formation in a first printing mode in which a peripheral speed ratio of the developing roller to the photosensitive drum is set to a predetermined peripheral speed ratio so as to form an image, and image formation in a second printing mode in which the peripheral speed ratio of the developing roller to the photosensitive drum is made larger than the predetermined peripheral speed ratio, thereby being capable of forming an image with a wider color gamut than in the first printing mode, the image forming apparatus comprising a first generation unit configured to generate first correction data for use in the image formation in the first printing mode, by using a result of measurement of density of the image formed in the first printing mode, a second generation unit configured to generate second correction data for use in the image formation in the second printing mode, by using a result of measurement of density of the image formed in the second printing mode, and a control unit configured to perform control so as to execute first processing for generating the first correction data by the first generation unit, and generating the second correction data by the second generation unit, or second processing for generating the first correction data by the first generation unit, and generating the second correction data using the generated first correction data and a difference between the density of the image formed in the first printing mode and the density of the image formed in the second printing mode, wherein in a case where a predetermined condition is satisfied, the control unit performs control so as to execute the first processing.

In a second aspect of the present invention, there is provided a method of controlling an image forming apparatus that includes a photosensitive drum on which an electrostatic latent image is formed, and a developing roller which causes developer to attach to the photosensitive drum, and is capable of performing image formation in a first printing mode in which a peripheral speed ratio of the developing roller to the photosensitive drum is set to a predetermined peripheral speed ratio so as to form an image, and image formation in a second printing mode in which the peripheral speed ratio of the developing roller to the photosensitive drum is made larger than the predetermined peripheral speed ratio, thereby being capable of forming an image with a wider color gamut than in the first printing mode, the method comprising generating first correction data for use in the image formation in the first printing mode, by using a result of measurement of density of the image formed in the first printing mode, generating second correction data for use in the image formation in the second printing mode, by using a result of measurement of density of the image formed in the second printing mode, and performing control so as to execute first processing for generating the first correction data and the second correction data, or second processing for generating the first correction data, and generating the second correction data using the generated first correction data and a difference between the density of the image formed in the first printing mode and the density of the image formed in the second printing mode, wherein said performing control includes performing control so as to execute the first processing, in a case where a predetermined condition is satisfied.

In a third aspect of the present invention, there is provided a non-transitory computer-readable storage medium storing a computer-executable program for executing a method of controlling an image forming apparatus that includes a photosensitive drum on which an electrostatic latent image is formed, and a developing roller which causes developer to attach to the photosensitive drum, and is capable of performing image formation in a first printing mode in which a peripheral speed ratio of the developing roller to the photosensitive drum is set to a predetermined peripheral speed ratio so as to form an image, and image formation in a second printing mode in which the peripheral speed ratio of the developing roller to the photosensitive drum is made larger than the predetermined peripheral speed ratio, thereby being capable of forming an image with a wider color gamut than in the first printing mode, wherein the method comprises generating first correction data for use in the image formation in the first printing mode, by using a result of measurement of density of the image formed in the first printing mode, generating second correction data for use in the image formation in the second printing mode, by using a result of measurement of density of the image formed in the second printing mode, and performing control so as to execute first processing for generating the first correction data and the second correction data, or second processing for generating the first correction data, and generating the second correction data using the generated first correction data and a difference between the density of the image formed in the first printing mode and the density of the image formed in the second printing mode, wherein said performing control includes performing control so as to execute the first processing, in a case where a predetermined condition is satisfied.

According to the present invention, it is possible to achieve both of reduction of the execution time of gradation correction and suppression of lowering of the accuracy of gradation correction.

Further features of the present invention will become apparent from the following description of exemplary embodiments (with reference to the attached drawings).

BRIEF DESCRIPTION OF THE DRAWINGS

FIG. 3 is a diagram of an example of a selection screen displayed on a display section appearing in FIG. 1.

FIG. 4 is a diagram useful in explaining a peripheral speed ratio of a developing roller to a photosensitive drum of the MFP shown in FIG. 1.

FIG. 5 is a schematic block diagram of software modules of the MFP shown in FIG. 1.

FIG. 19 is a diagram showing an example of update reference information managed by the MFP shown in FIG. 1.

DESCRIPTION OF THE EMBODIMENTS

The present invention will now be described in detail below with reference to the accompanying drawings showing embodiments thereof.

Although in the embodiments, a description will be given of a case where the present invention is applied to an MFP as an image forming apparatus, the present invention may be applied not only to the MFP, but also to apparatuses that perform electrophotographic image formation processing, such as a copy machine, a laser printer, and a facsimile machine.

Figure 1:
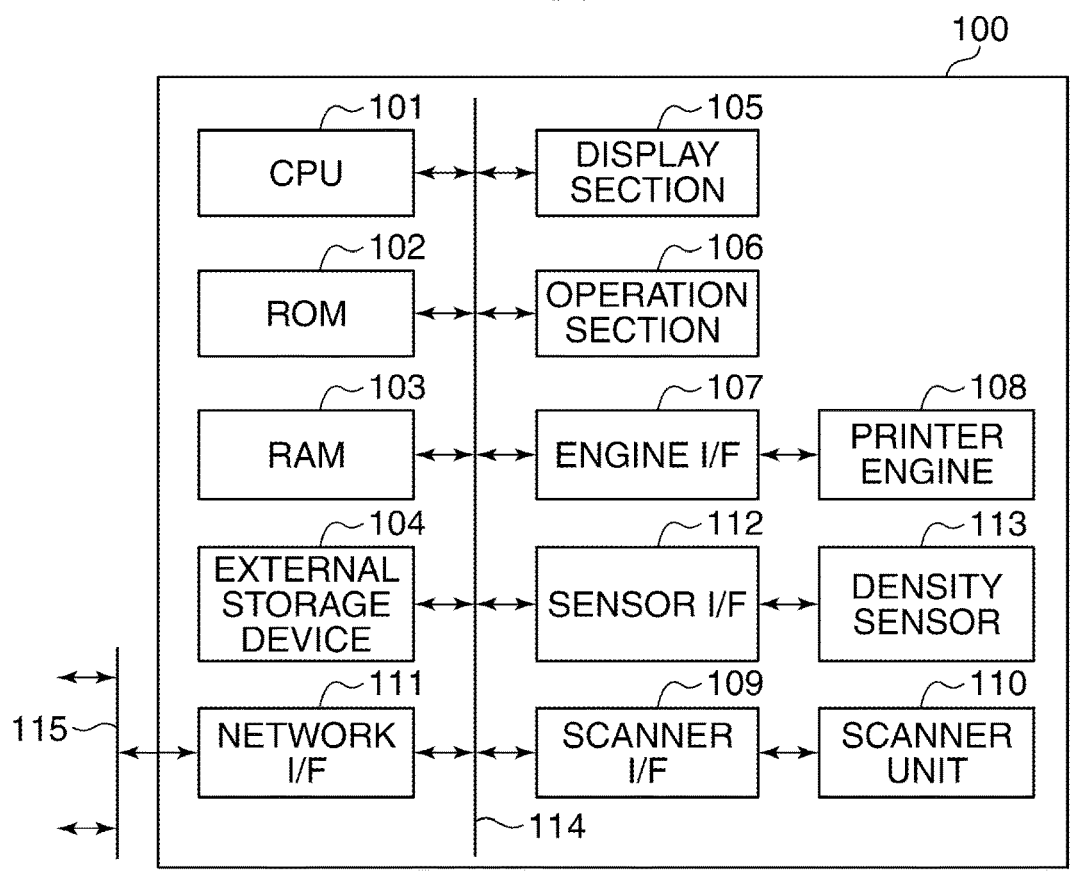
FIG. 1 is a schematic block diagram of an MFP as an image forming apparatus according to an embodiment of the present invention.

FIG. 1 is a schematic block diagram of the MFP, denoted by reference numeral 100, as the image forming apparatus according to the embodiment of the present invention.

Referring to FIG. 1, the MFP 100 includes a CPU 101, a ROM 102, a RAM 103, an external storage device 104, a display section 105, an operation section 106, an engine interface 107, a printer engine 108, a scanner interface 109, and a scanner unit 110. Further, the MFP 100 includes a network interface 111, a sensor interface 112, and a density sensor 113 (toner density-detecting unit). The CPU 101, the ROM 102, the RAM 103, the external storage device 104, the display section 105, the operation section 106, the engine interface 107, the scanner interface 109, the network interface 111, and the sensor interface 112 are interconnected via a system bus 114.

The MFP 100 is equipped with a scan function, a print function, a copy function, a communication function, and so forth, and executes a job using an associated one of the above-mentioned functions. For example, the MFP 100 performs processing for printing a multi-color image using the toners of four colors C, M, Y, and K.

The CPU 101 controls the overall operation of the MFP 100. For example, the CPU 101 performs processing operations of software modules 500, described hereinafter with reference to FIG. 5, by executing programs stored in the ROM 102. The ROM 102 is a read-only memory storing a system boot program, a program for controlling the printer engine 108, as well as character data, character code information, and so forth. The RAM 103 is a volatile random access memory, and is used as a work area for the CPU 101 and an area for temporarily storing data. The external storage device 104 includes a hard disk, and spools data using the hard disk. Further, the external storage device 104 is used as storage areas for programs, information files, image data, and so forth, and is further used as a work area for the CPU 101. The engine interface 107 connects the printer engine 108 to the system bus 114. In a case where the MFP 100 performs print processing, necessary information for executing print processing is sent and received between the CPU 101 and the printer engine 108 via the engine interface 107.

Figure 2:
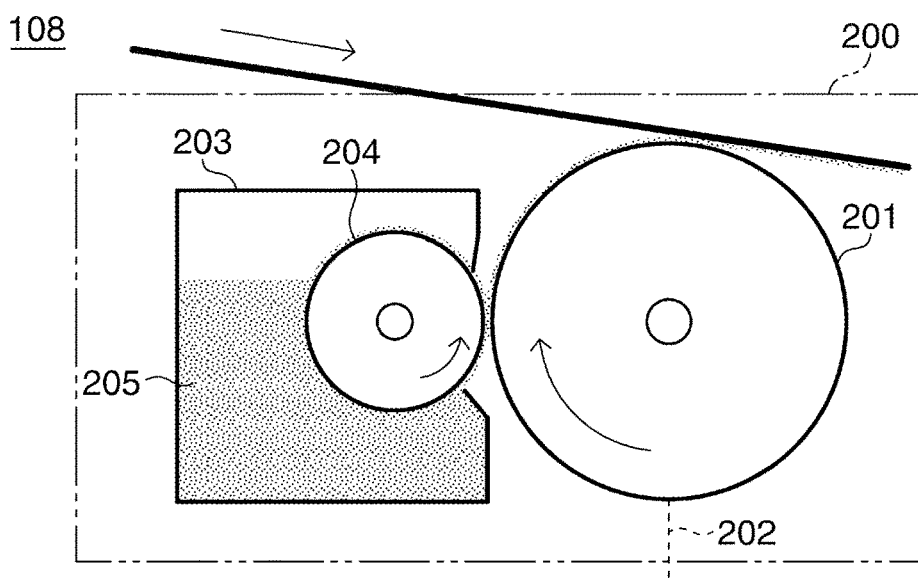
FIG. 2 is a diagram useful in explaining a printer engine appearing in FIG. 1.

The printer engine 108 prints image data stored in the RAM 103 or the external storage device 104 on a sheet according to a control command sent from the CPU 101. The printer engine 108 includes a plurality of developing units 200 shown in FIG. 2, which are associated with the colors of C, M, Y, and K, and each developing unit 200 includes a photosensitive drum 201 (photosensitive member) and a developing device 203. The printer engine 108 irradiates the photosensitive drum 201 driven for rotation with a laser beam 202 to thereby form an electrostatic latent image on a surface of the photosensitive drum 201. The developing device 203 causes toner 205 to be attached to the surface of the photosensitive drum 201 in the form of a thin film using a developing roller 204 driven for rotation. As a result, the electrostatic latent image formed on the surface of the photosensitive drum 201 is developed. The developed image is transferred from the photosensitive drum 201 onto a sheet.

The scanner interface 109 connects the scanner unit 110 to the system bus 114. In a case where the MFP 100 performs scan processing, necessary information for executing scan processing is sent and received between the CPU 101 and the scanner unit 110 via the scanner interface 109. The scanner unit 110 reads an original placed on an original platen glass, not shown, generates image data based on a reading result, and stores the generated image data in the RAM 103 and the external storage device 104 according to a control command sent from the CPU 101. The network interface 111 performs data communication with an external apparatus connected to a network 115. The network 115 is a LAN (Local Area Network), a public switched telephone network (PSTN), or the like.

Figure 9:
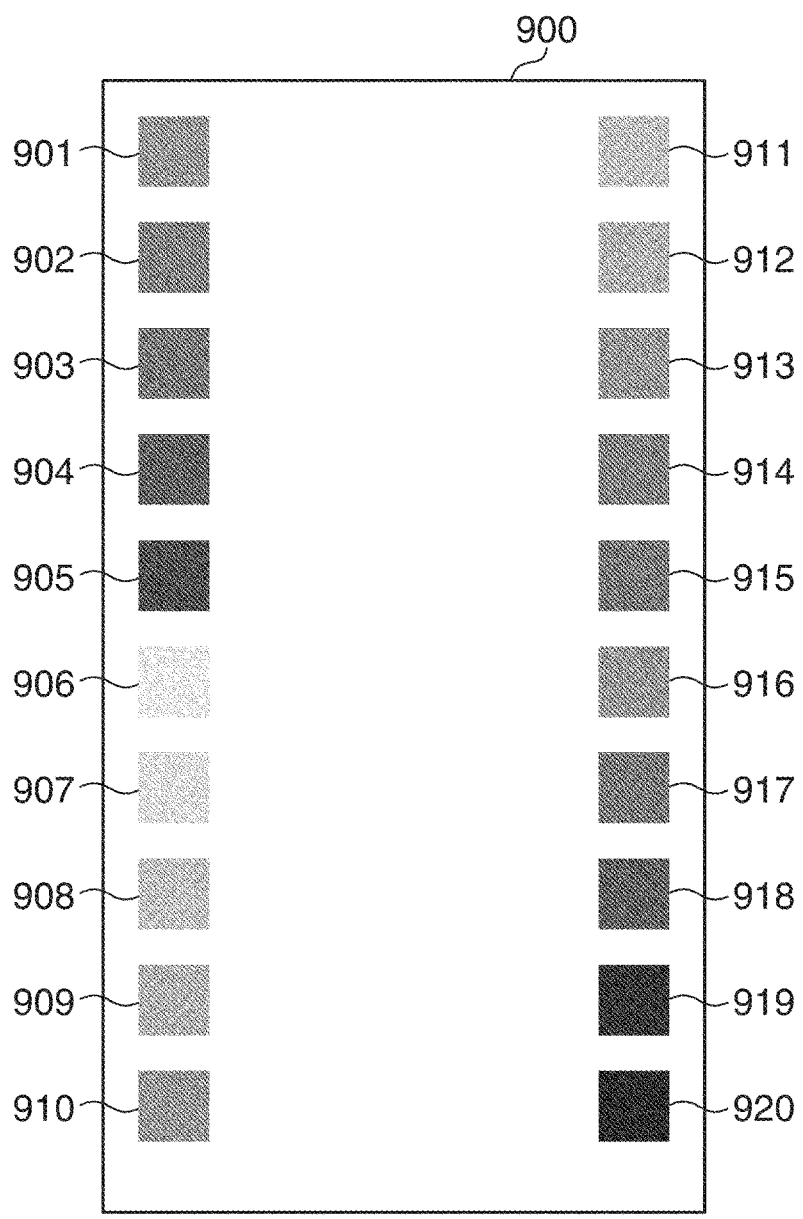
FIG. 9 is a diagram of an example of a gradation pattern image formed on the photosensitive drum appearing in FIG. 2.

The display section 105 includes a liquid crystal display, not shown, and displays settings of the MFP 100, a job execution state, an error state, etc. For example, the display section 105 displays a selection screen 300 shown in FIG. 3. The selection screen 300 is an operation screen for setting a printing mode, and includes a normal print button 301 and a high chroma print button 302. A user can select one of the normal print button 301 and the high chroma print button 302. When the normal print button 301 is selected, the MFP 100 is set to a normal printing mode (first printing mode). In the normal printing mode of the MFP 100, a ratio of a rotational speed of the developing roller 204 to a rotational speed of the photosensitive drum 201 (hereinafter referred to as the "peripheral speed ratio of the developing roller 204 to the photosensitive drum 201") is controlled to 1:1 as shown in FIG. 4. When the high chroma print button 302 is selected, the MFP 100 is set to a high chroma printing mode (second printing mode) which makes it possible to realize higher chroma printing than in the normal printing mode. The high chroma printing mode differs from the normal printing mode in the operating condition of the photosensitive drum 201. In the high chroma printing mode of the MFP 100, printing is performed by controlling the rotational speed of the developing roller 204 to the same speed as that in the normal printing mode, and controlling the rotational speed of the photosensitive drum 201 to a lower speed than in the normal printing mode, more specifically, to a rotational speed corresponding to ⅓ of that in the normal printing speed. This makes it possible to provide printed matter with a high chroma (wide color gamut) by attaching more toner to the photosensitive drum 201 than in the normal printing mode. Note that the rotational speed of the photosensitive drum 201 is determined based on a fixing speed at which toner can be positively fixed on a sheet by a fixing device, not shown, that fixes toner on the sheet with heat and pressure. The operation section 106 is an input device, such as hard keys, not shown, and a touch panel arranged on the display section 105. The operation section 106 receives e.g. an instruction for executing a job and an instruction for changing the settings of the MFP 100, which are each given by a user's operation. The sensor interface 112 connects the density sensor 113 to the system bus 114. The density sensor 113 reads a gradation pattern image 900, described hereinafter with reference to FIG. 9, which is formed on the photosensitive drum 201, and detects a toner density.

FIG. 5 is a schematic block diagram of the software modules 500 of the MFP 100 shown in FIG. 1.

Referring to FIG. 5, the software modules 500 include an image input module 501, an image processing module 502, an image output module 505, a development control module 506, a density detection module 507, a correlation calculation module 508, and a gradation correction table generation module 509. The image processing module 502 includes a gradation correction module 503 and a halftone processing module 504. The processing operations of the software modules 500 are performed by the CPU 101 executing respective programs therefor which are stored in the ROM 102.

The image input module 501 receives an input of image data, such as a bitmap image. The image data is output from an external apparatus connected to the network 115, the scanner unit 110, or the like. The image input module 501 stores the received image data in the RAM 103 and the external storage device 104. The image processing module 502 performs image processing, such as gradation correction processing and halftone processing, on the stored image data. Further, the image processing module 502 converts the stored image data to an image which the image output module 505 can print on a sheet (hereinafter referred to as the "print image").

The gradation correction module 503 converts image data to data suitable for the printer engine 108, using a gradation correction table generated by the gradation correction table generation module 509. For example, the gradation correction module 503 performs gradation correction processing by applying an associated gradation correction table to each of the C, M, Y, and K components included in the image data. The halftone processing module 504 performs halftone processing on the image data corrected by the gradation correction module 503. In many cases, the printer engine 108 is compatible with only outputs small in the number of gradations, such as 2, 4, and 16 gradations. For this reason, to realize stable halftone expression also in a small number of gradations, the halftone processing module 504 performs halftone processing. Note that various methods, such as a density pattern method, a systematic dither method, and an error diffusion method, are applied to the halftone processing performed by the halftone processing module 504.

The image output module 505 acquires a print image from the image processing module 502, converts the acquired print image to a video signal, and sends the converted video signal to the printer engine 108. The printer engine 108 having received the video signal performs respective processes for exposure, development, transfer, and fixing, to thereby print the print image corresponding to the received video signal on a sheet. The development control module 506 controls the operation of the printer engine 108. More specifically, the development control module 506 determines respective rotational speeds of the photosensitive drum 201 and the developing roller 204 of the printer engine 108. The density detection module 507 controls execution of toner density detection processing for performing gradation correction. For example, the density detection module 507 selects one gradation patch image information item out of a plurality of gradation patch image information items stored e.g. in the external storage device 104. The gradation patch image information is information required to form the gradation pattern image 900, described hereinafter with reference to FIG. 9, on the photosensitive drum 201. Further, the density detection module 507 controls the density sensor 113 so as to detect a toner density of the gradation pattern image 900 formed on the photosensitive drum 201, and stores a result of the detection (hereinafter referred to as the "density detection result") e.g. in the external storage device 104. The correlation calculation module 508 generates a difference table used for generating, from one gradation correction table, another gradation correction table. The gradation correction table generation module 509 generates a gradation correction table using the density detection result stored in the external storage device 104 or the like and the difference table.

Next, a description will be given of gradation correction performed by the MFP 100.

Figure 6A:
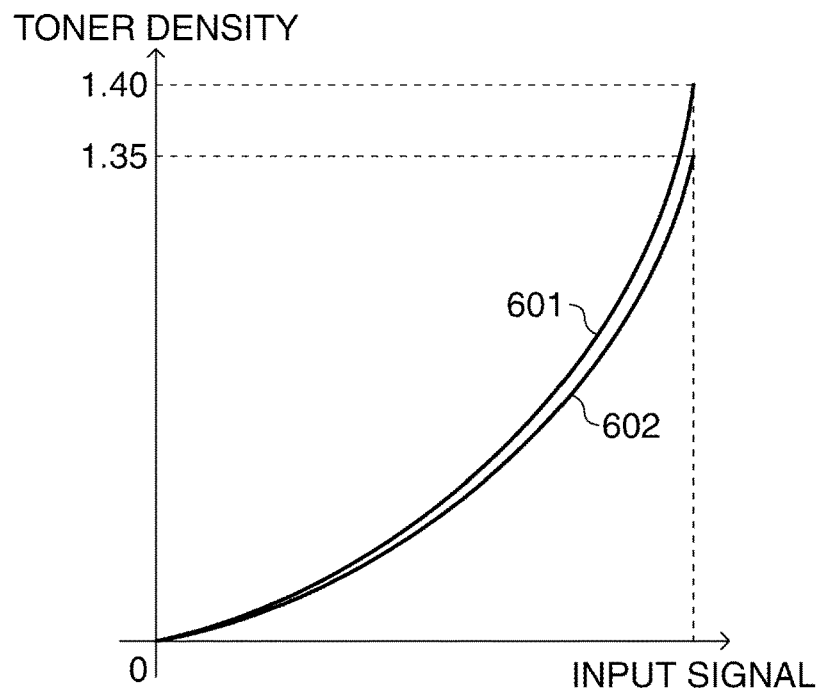
FIG. 6A is a diagram useful in explaining changes in toner density characteristics of printed matter printed in a normal printing mode, which are ascribable to aging of the MFP shown in FIG. 1.
Figure 6B:
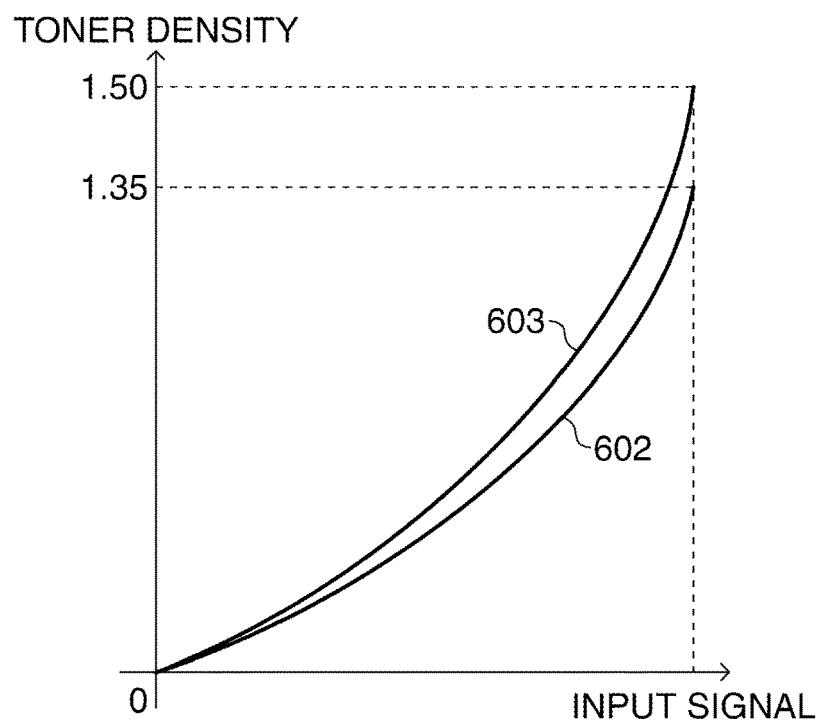
FIG. 6B is a diagram useful in explaining changes in toner density characteristics of printed matter printed in a high chroma printing mode, which are ascribable to aging of the MFP shown in FIG. 1.

For example, when a predetermined number or more of sheets are printed by the MFP 100, as shown in FIG. 6A, density characteristics 601 of printed matter printed in the normal printing mode are shifted from target density characteristics 602 set in advance, which lowers density reproducibility of the printed matter. To solve this problem, the MFP 100 performs gradation correction. In the gradation correction, there is generated a gradation correction table for making the density characteristics of printed matter close to the target density characteristics. The MFP 100 forms the gradation pattern image 900 shown in FIG. 9 on the photosensitive drum 201, reads a toner density of the gradation pattern image 900, and generates a gradation correction table based on the density detection result obtained by reading the toner density. On the other hand, in the MFP 100, although density characteristics 603 of the printed matter printed in the high chroma printing mode are also shifted from the target density characteristics 602 as shown in FIG. 6B, an amount of shift in the high chroma printing mode is different from that in the normal printing mode. For this reason, the MFP 100 generates a normal gradation correction table (first correction data) as a gradation correction table associated with the normal printing mode, and a high chroma gradation correction table (second correction data) as a gradation correction table associated with the high chroma printing mode.

Figure 7:
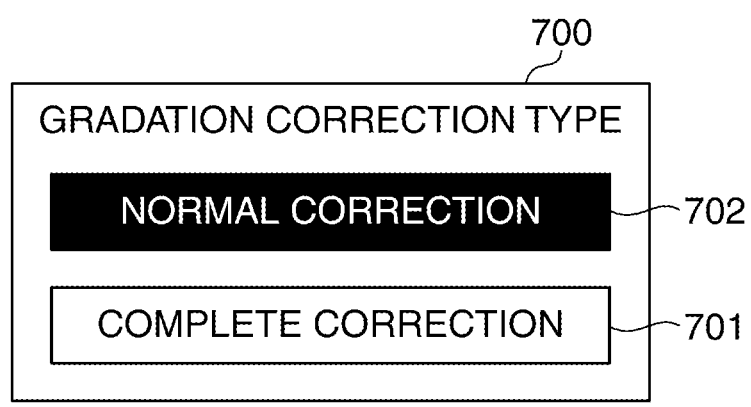
FIG. 7 is a diagram of an example of an operation screen displayed on the display section appearing in FIG. 1.

The MFP 100 receives an instruction for executing gradation correction via an operation screen 700, shown in FIG. 7, which is displayed on the display section 105. The operation screen 700 includes a complete correction button 701 and a normal correction button 702. In a case where the complete correction button 701 is selected, the MFP 100 performs gradation correction to be performed in the case of selection of the complete correction button 701 (hereinafter referred to as the "complete correction"), as first processing in which aging of the MFP 100 is taken into account. In the complete correction, the MFP 100 forms the gradation pattern image 900 shown in FIG. 9, on the photosensitive drum 201, in each of the normal printing mode and in the high chroma printing mode, and generates a normal gradation correction table and a high chroma gradation correction table based on each associated density detection result of the gradation pattern image 900. Further, in the case where the complete correction button 701 is selected, the MFP 100 generates a difference table for use in generating the high chroma gradation correction table based on the normal gradation correction table. On the other hand, in a case where the normal correction button 702 is selected, the MFP 100 performs gradation correction to be performed in the case of selection of the normal correction button 702 (hereinafter referred to as the "normal correction"), as second processing which is shorter in execution time than the gradation correction to be performed in the case of selection of the complete correction button 701. In the normal correction, the MFP 100 generates a normal gradation correction table based on the density detection result of the gradation pattern image 900 printed in the normal printing mode, and generates a high chroma gradation correction table from the normal gradation correction table based on the difference table.

Figure 8:
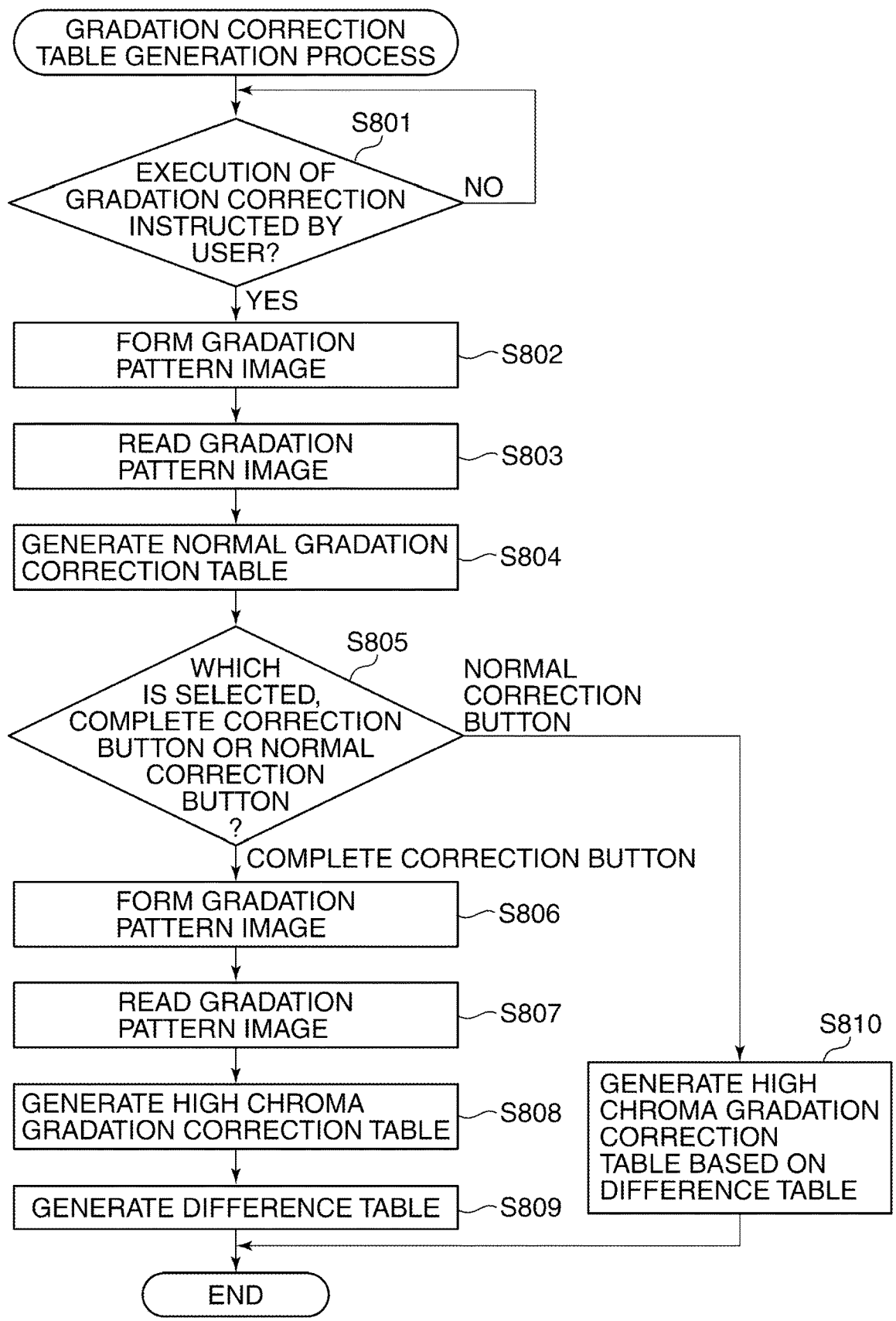
FIG. 8 is a flowchart of a gradation correction table generation process performed by the MFP shown in FIG. 1.

FIG. 8 is a flowchart of a gradation correction table generation process performed by the MFP 100 shown in FIG. 1.

The gradation correction table generation process in FIG. 8 is performed by the CPU 101 that loads an associated program stored in the ROM 102 into the RAM 103 and executes the loaded program, in response to instruction of execution of gradation correction by a user's operation on the operation screen 700. Further, the gradation correction table generation process in FIG. 8 is performed based on precondition that a gradation correction table as a reference (hereinafter referred to as the "reference gradation correction table") has been stored in the ROM 102 in advance.

Referring to FIG. 8, first, the CPU 101 waits until execution of gradation correction is instructed by a user e.g. through selection of one of the complete correction button 701 and the normal correction button 702. Then, when execution of gradation correction is instructed by the user (YES to a step S801), the CPU 101 reads one gradation patch image information item out of a plurality of gradation patch image information items stored in the ROM 102. The CPU 101 transfers the read gradation patch image information item to the image input module 501.

Then, the CPU 101 performs processing for forming a gradation pattern image based on the transferred gradation patch image information item (step S802). In the step S802, the CPU 101 sets the reference gradation correction table stored in the ROM 102 in advance for the gradation correction module 503, and performs gradation correction on the gradation patch image information item based on the reference gradation correction table. Further, the CPU 101 causes the halftone processing module 504 to perform halftone processing on the gradation patch image information item on which gradation correction has been performed, and transfers the gradation patch image information item on which halftone processing has been performed to the image output module 505. Further, the CPU 101 acquires the respective rotational speeds of the photosensitive drum 201 and the developing roller 204 in the normal printing mode, and controls the photosensitive drum 201 and the developing roller 204 such that they perform rotation at the acquired rotational speeds. The CPU 101 causes the image output module 505 to transfer the gradation patch image information item on which halftone processing has been performed to the printer engine 108, thereby causing the gradation pattern image 900 to be formed on the photosensitive drum 201 of the printer engine 108.

The gradation pattern image 900 has a plurality of patches, e.g. 20 patches 901 to 920, which are different in color and gradation. The patches 901 to 910 are formed on a left end of the photosensitive drum 201 at equally-spaced intervals, and the patches 911 to 920 are formed on a right end of the photosensitive drum 201 at equally-spaced intervals. Note that in the present embodiment, the density sensor 113 is disposed at a location where the patches 901 to 910 can be measured, and another density sensor 113 having the same function is disposed at a location where the patches 911 to 920 can be measured. In the following description, the density sensor 113 and the other density sensor 113 are each referred to as the density sensor 113 without differentiating from each other. The color and gradation of each patch are expressed in 8-bit signal values, and the signal value of a color component corresponding to each patch is set within a range from 0 to 255. As the signal value is larger, the toner density is higher. The patches 901 to 905 are images for detecting the toner density of the M component, and the toner density is higher as the patch number is larger. The patches 906 to 910 are images for detecting the toner density of the Y component, and the toner density is higher as the patch number is larger. The patches 911 to 915 are images for detecting the toner density of the C component, and the toner density is higher as the patch number is larger. The patches 916 to 920 are images for detecting the toner density of the K component, and the toner density is higher as the patch number is larger. In the following description, the patches 901 to 905 are referred to as the M patches 901 to 905, the patches 906 to 910 are referred to as the Y patches 906 to 910, the patches 911 to 915 are referred to as the C patches 911 to 915, and the patches 916 to 920 are referred to as the K patches 916 to 920.

Figure 10:
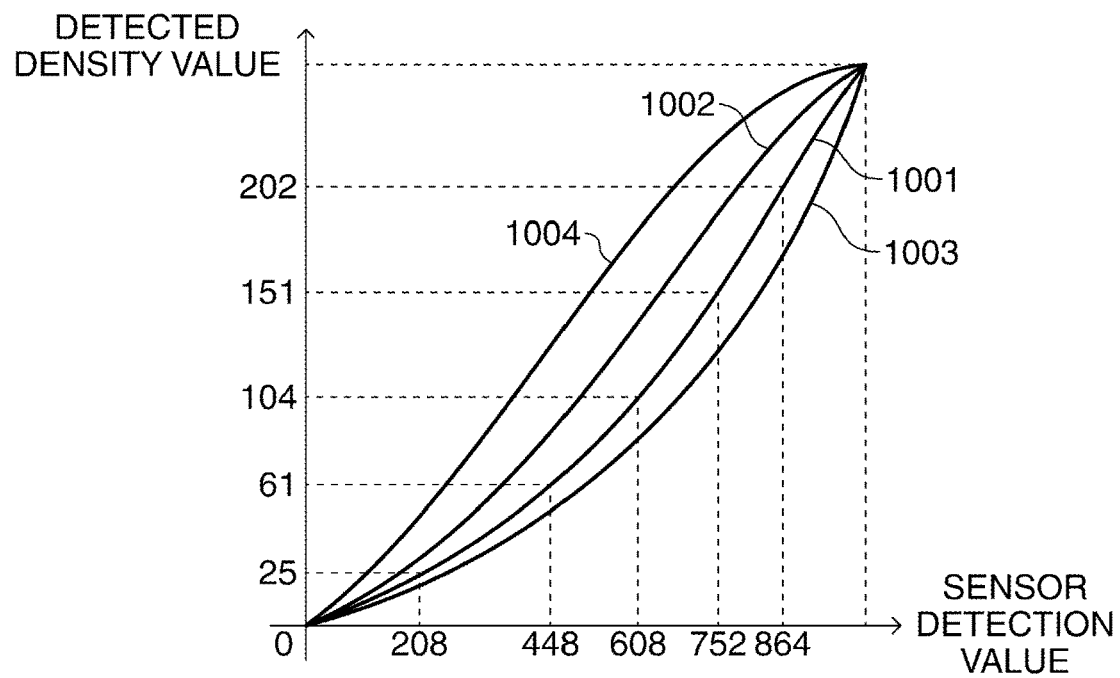
FIG. 10 is a diagram of an example of a density conversion table used by a CPU appearing in FIG. 1.

Then, the CPU 101 causes the density sensors 113 to read the gradation pattern image 900 formed on the photosensitive drum 201 (step S803), and acquires the sensor detection value of each patch read by an associated one of the density sensors 113. The CPU 101 converts the acquired sensor detection value of each patch to a detected density value indicative of the toner density based on density conversion tables 1001 to 1004, shown in FIG. 10, stored e.g. in the ROM 102 in advance. The density conversion tables 1001 to 1004 manage the detected density values associated with the sensor detection values of C, M, Y, and K, respectively. In FIG. 10, the horizontal axis represents the sensor detection value, and the vertical axis represents the detected density value. In the step S803, for example, in a case where the sensor detection value of the C patch 911 is equal to "208", the CPU 101 converts the sensor detection value "208" to a detected density value "25" based on the density conversion table 1001 of the C component.

Then, the CPU 101 generates a normal gradation correction table (step S804). In the step S804, the CPU 101 generates a plurality of gradation correction tables associated with the colors of C, M, Y, and K, respectively. The following description will be given of generation of the normal gradation correction table of the C component, by way of example. Further, in the following description, it is assumed that the C patch 911 has a signal value of "43", a detected density value of "25", and a target density value of "18", the C patch 912 has a signal value of "85", a detected density value of "61", and a target density value of "49", the C patch 913 has a signal value of "128", a detected density value of "104", and a target density value of "91", the C patch 914 has a signal value of "170", a detected density value of "151", and a target density value of "139", and the C patch 915 has a signal value of "213", a detected density value of "202", and a target density value of "195".

Figure 11:
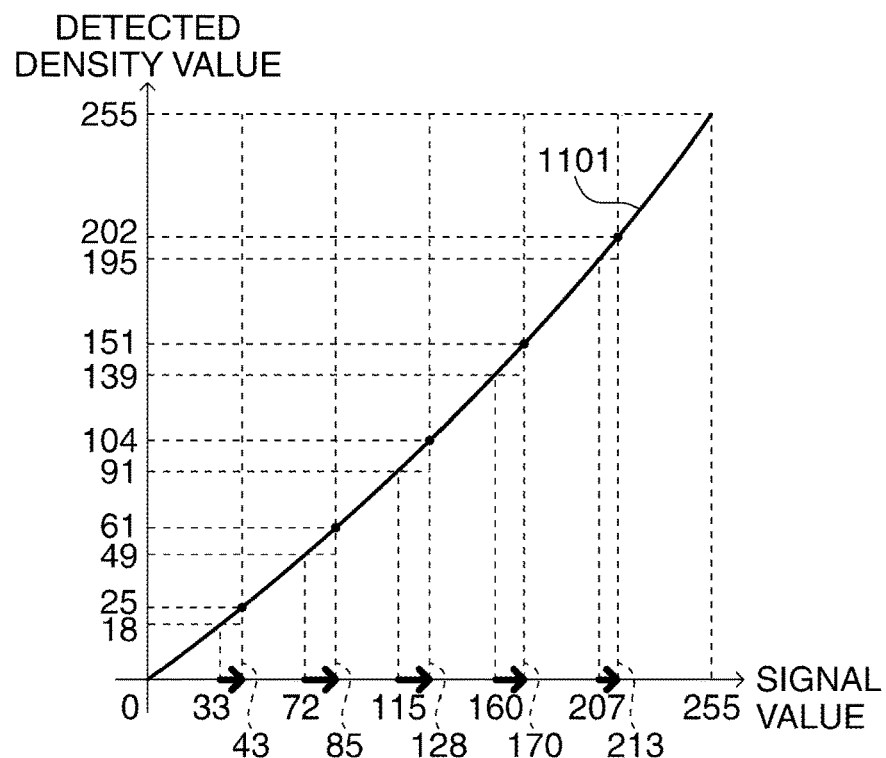
FIG. 11 is a diagram showing a relationship between a detected density value and a signal value.
Figure 12:
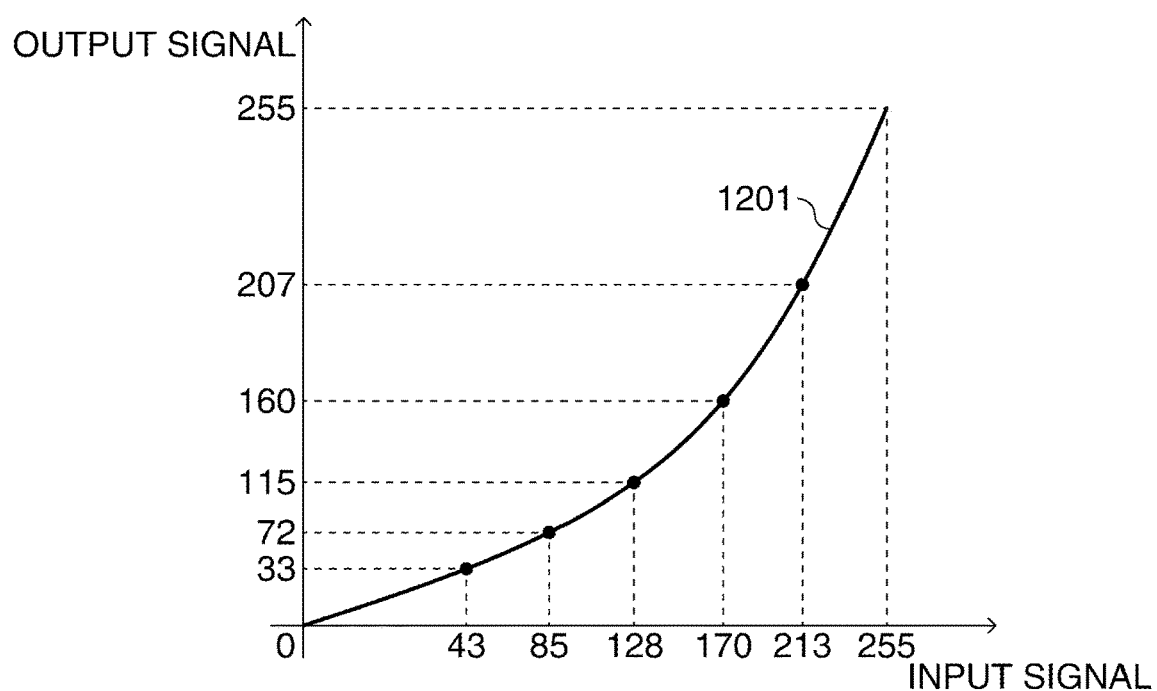
FIG. 12 is a diagram of an example of a normal gradation correction table generated by the MFP shown in FIG. 1.
Figure 13:
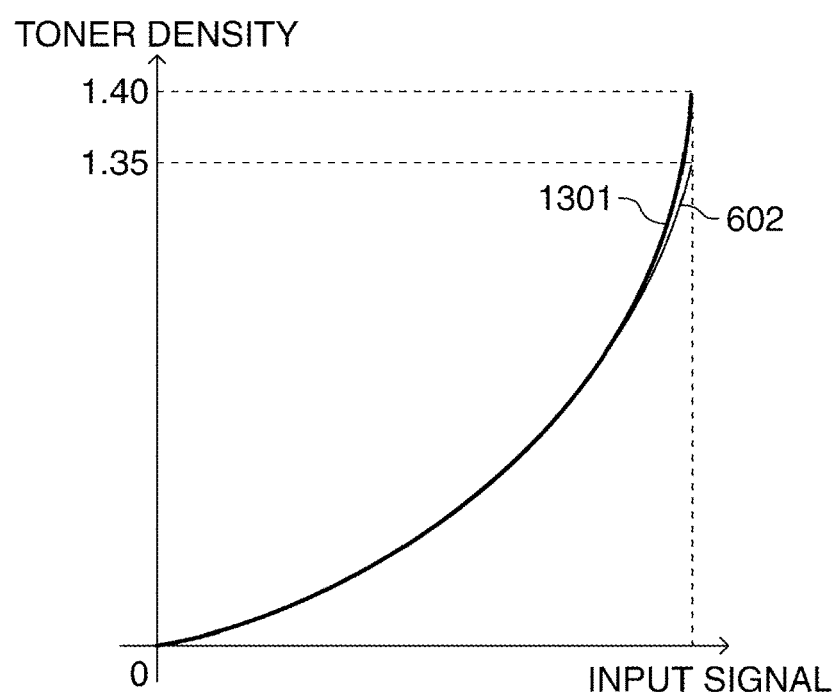
FIG. 13 is a diagram showing a result of gradation correction using the normal gradation correction table shown in FIG. 12.

The CPU 101 derives a gradation curve 1101, shown in FIG. 11, based on a relationship between the acquired detected density values and the signal values. The CPU 101 acquires target signal values "33", "72", "115", "160", and "207" corresponding to the target density values "18", "49", "91", "139", and "195" based on the gradation curve 1101. The CPU 101 generates a normal gradation correction table 1201 of the C component, shown in FIG. 12, for converting the signal value of the C component to the target signal value. For example, the CPU 101 converts the signal value "43" of the C component to the target signal value "33" using the normal gradation correction table 1201 of the C component. The CPU 101 performs the same processing with respect to M, Y, and K to generate the normal gradation correction tables of the respective color components. By performing gradation correction using the normal gradation correction tables of the respective color components, the MFP 100 can make the density characteristics of printed matter close to the target density characteristics 602 as indicated by a characteristic curve 1301 in FIG. 13 in the normal printing mode. Then, the CPU 101 determines which of the complete correction button 701 and the normal correction button 702 has been selected (step S805) (gradation correction execution control unit).

If it is determined in the step S805 that the complete correction button 701 has been selected, the CPU 101 reads one of the plurality of gradation patch image information items stored in the ROM 102. The CPU 101 transfers the read gradation patch image information item to the image input module 501. Then, the CPU 101 performs processing for forming the gradation pattern image 900 (step S806). In the step S806, the CPU 101 sets the reference gradation correction table stored in the ROM 102 for the gradation correction module 503, and performs gradation correction on the gradation patch image information item based on the reference gradation correction table. Further, the CPU 101 causes the halftone processing module 504 to perform halftone processing on the gradation patch image information on which gradation correction has been performed, and transfers the gradation patch image information on which halftone processing has been performed to the image output module 505. Further, the CPU 101 acquires the respective rotational speeds of the photosensitive drum 201 and the developing roller 204 in the high chroma printing mode, and controls the photosensitive drum 201 and the developing roller 204 such that they perform rotation at the acquired rotational speeds. The CPU 101 controls the image output module 505 so as to transfer the gradation patch image information item on which halftone processing has been performed to the printer engine 108, thereby causing the gradation pattern image 900 to be formed on the photosensitive drum 201 of the printer engine 108.

Figure 14:
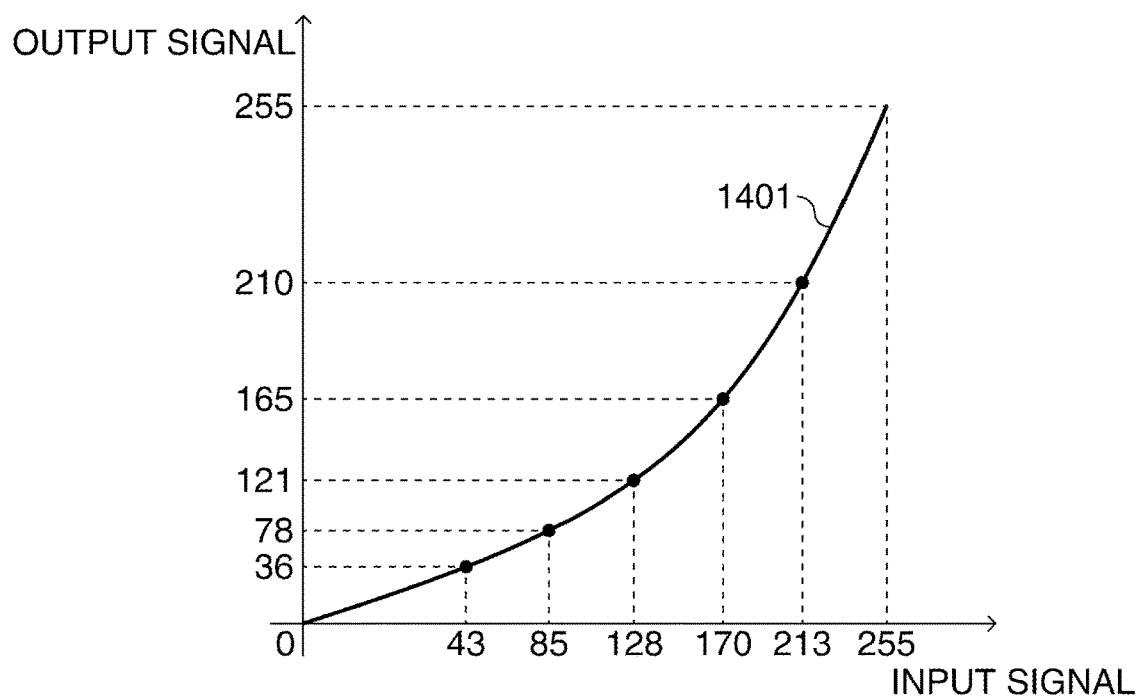
FIG. 14 is a diagram of an example of a high chroma gradation correction table generated by the MFP shown in FIG. 1.
Figure 15:
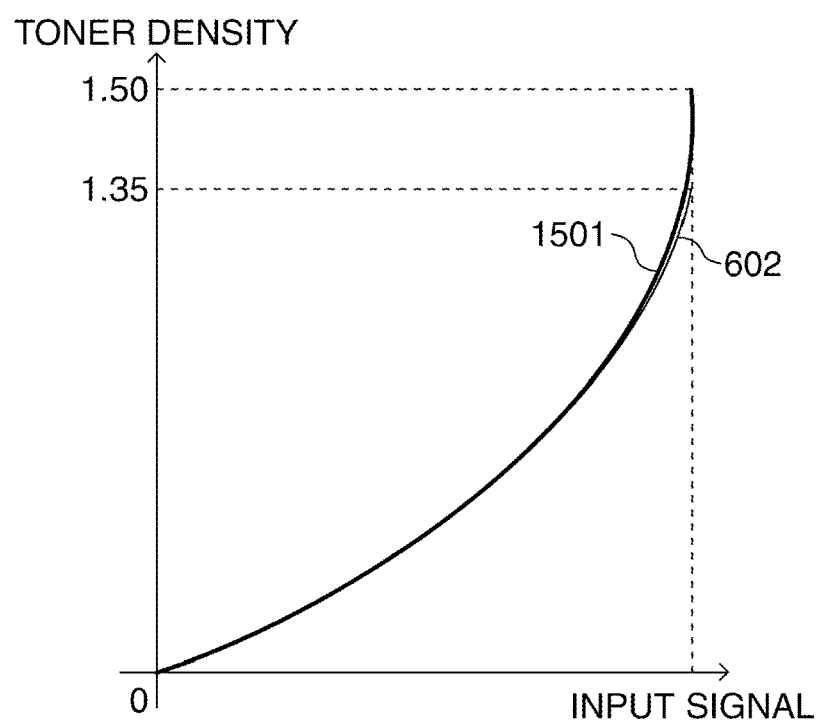
FIG. 15 is a diagram showing a result of gradation correction using the high chroma gradation correction table shown in FIG. 14.

Then, the CPU 101 causes the density sensor 113 to read the gradation pattern image 900 formed on the photosensitive drum 201 (step S807), and acquires the sensor detection values of the respective patches on the gradation pattern image 900. The CPU 101 converts the acquired sensor detection values of the respective patches to detected density values based on the density conversion tables 1001 to 1004. Then, the CPU 101 generates high chroma gradation correction tables (step S808). In the step S808, the CPU 101 generates the high chroma gradation correction tables of the respective color components, including a high chroma gradation correction table 1401 of the C component, shown in FIG. 14. Similar to the normal gradation correction table, the high chroma gradation correction table is also used to convert each signal value to an associated target signal value. By performing gradation correction using the high chroma gradation correction tables of the respective colors, the MFP 100 can make the density characteristics of printed matter close to the target density characteristics 602 as indicated by a characteristic curve 1501 in FIG. 15 in the high chroma printing mode.

Figure 16:
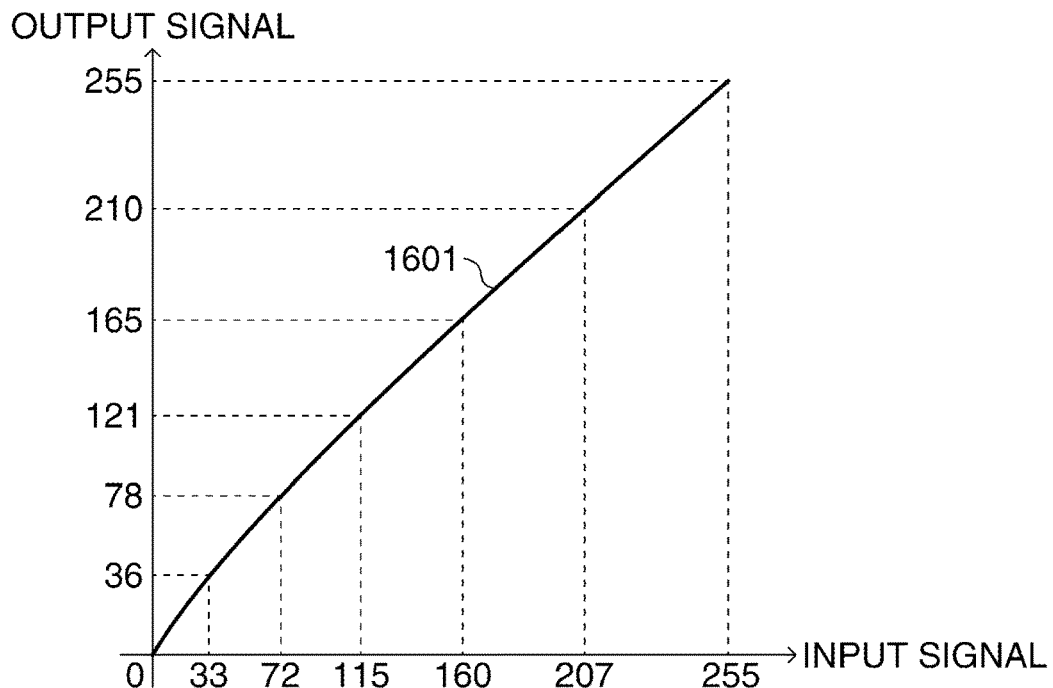
FIG. 16 is a diagram of an example of a difference table generated by the MFP shown in FIG. 1.
Figure 17:
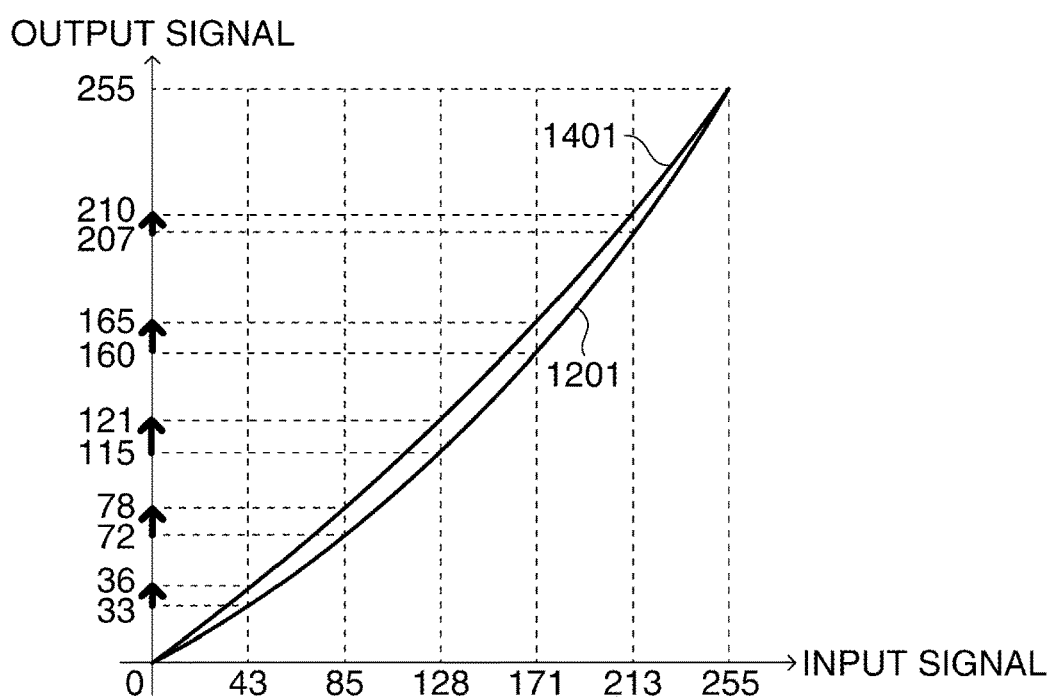
FIG. 17 is a diagram useful in explaining reading of a normal target signal value and a high chroma target signal value in a step in FIG. 8.

Then, the CPU 101 causes the correlation calculation module 508 to generate a difference table (conversion table) (step S809). The difference table is generated for each color component. For example, in a case where a difference table 1601 of the C component in FIG. 16 is generated, in the step S809, the CPU 101 converts each signal value to an associated target signal value based on each of the normal gradation correction table 1201 of the C component and the high chroma gradation correction table 1401 of the C component. The CPU 101 converts e.g. a signal value of "43" to a target signal value (hereinafter referred to as the "normal target signal value") of "33" using the normal gradation correction table 1201. Further, the CPU 101 converts the signal value of "43" to a target signal value (hereinafter referred to as the "high chroma target signal value") of "36" using the high chroma gradation correction table 1401. The CPU 101 performs the above-mentioned processing also with respect to the other signal values in the range of 1 to 254, including e.g. "85", "128", "171", and "213" in FIG. 17. The CPU 101 sets a normal target signal value and a high chroma target signal value, which have been converted from the same signal value, as one set, and generates the difference table 1601 of the C component, derived by setting the horizontal axis to the normal target signal values and the vertical axis to the high chroma target signal values, as shown in FIG. 16. For example, when a normal target signal value of "33" is input with respect to the difference table 1601 of the C component, a high chroma target signal value of "36" converted from the same signal value is obtained. The CPU 101 performs the same processing also with respect to M, Y, and K, and generates the difference tables for the respective colors. The difference table is generated based on the normal gradation correction table and the high chroma gradation correction table, generated in the steps S804 and S808, respectively. Therefore, aging which cannot be predicted at the time of factory shipment of the MFP 100 is taken into account in the difference tables. The difference tables of the respective color components are held in the RAM 103 and the external storage device 104, and are updated by execution of the step S809. After that, the CPU 101 terminates the present process.

If it is determined in the step S805 that the normal correction button 702 has been selected, the CPU 101 generates the high chroma gradation correction tables of the respective color components from the normal gradation correction tables of the respective color components, generated in the step S804, based on the difference tables of the respective color components (step S810). In the step S810, for example, the CPU 101 inputs each normal target signal value of the C component in the difference table 1601 of the C component to acquire a corresponding high chroma target signal value, and generates the high chroma gradation correction table of the C component based on the acquired high chroma target signal value. After that, the CPU 101 terminates the present process.

According to the gradation correction table generation process in FIG. 8, a normal gradation correction table is generated based on a density detection result, and in a case where normal correction is performed, a high chroma gradation correction table is generated from the normal gradation correction table based on the difference table. This makes it possible to eliminate, when performing gradation correction, the need of execution of the steps S806 to S808 for generating a high chroma gradation correction table, and thereby reduce the execution time of gradation correction. Further, the difference table is generated based on the density detection result of the gradation pattern image 900. This makes it possible to generate a high chroma gradation correction table in which aging which cannot be predicted at the time of factory shipment of the MFP is taken into account, using the difference table. That is, it is possible to perform gradation correction in which aging which cannot be predicted at the time of factory shipment of the MFP is taken into account, without executing the steps S806 to S808, and thereby achieve both of reduction of the execution time of gradation correction and suppression of lowering of the accuracy of gradation correction.

Further, according to the gradation correction table generation process in FIG. 8, in a case where the complete correction is performed, the high chroma gradation correction table is generated based on the density detection result. This makes it possible to generate a high chroma gradation correction table in which recent aging of the MFP is taken into account, and thereby positively suppress lowering of the accuracy of gradation correction in the high chroma printing mode.

Further, in the gradation correction table generation process in FIG. 8, the operation screen 700 for prompting a user to select the complete correction or the normal correction is displayed on the display section 105. This makes it possible to reflect user's intention concerning which of the complete correction and the normal correction is to be performed.

In the gradation correction table generation process in FIG. 8, in the high chroma printing mode, the rotational speed of the photosensitive drum 201 out of the photosensitive drum 201 and the developing roller 204 is lower than in the normal printing mode. In other words, gradation correction in the high chroma printing mode is longer in execution time than gradation correction in the normal printing mode. From the viewpoint of reduction of the total execution time of gradation correction as much as possible, it is preferable to generate a high chroma gradation correction table for use in gradation correction in the high chroma printing mode rather than a normal gradation correction table for use in gradation correction in the normal printing mode, based on a difference table. To this end, in the present embodiment, a high chroma gradation correction table for use in gradation correction in the high chroma printing mode which is relatively longer in execution time is generated based on the difference table, and hence it is possible to reduce the total execution time of gradation correction as much as possible.

Further, in the gradation correction table generation process in FIG. 8, the difference table is held in the MFP 100. This makes it possible to perform gradation correction in the high chroma printing mode, in which aging which cannot be predicted at the time of factory shipment of the MFP is taken into account, using the difference table held in the MFP 100 without unnecessarily increasing the execution time of gradation correction until the next complete correction is performed.

Although the present invention is described with reference to the above-described embodiment, the present invention is not limited to the above-described embodiment. For example, the gradation correction table generation process in FIG. 8 may be performed when the number of printed sheets reaches a predetermined number set in advance.

Figure 18:
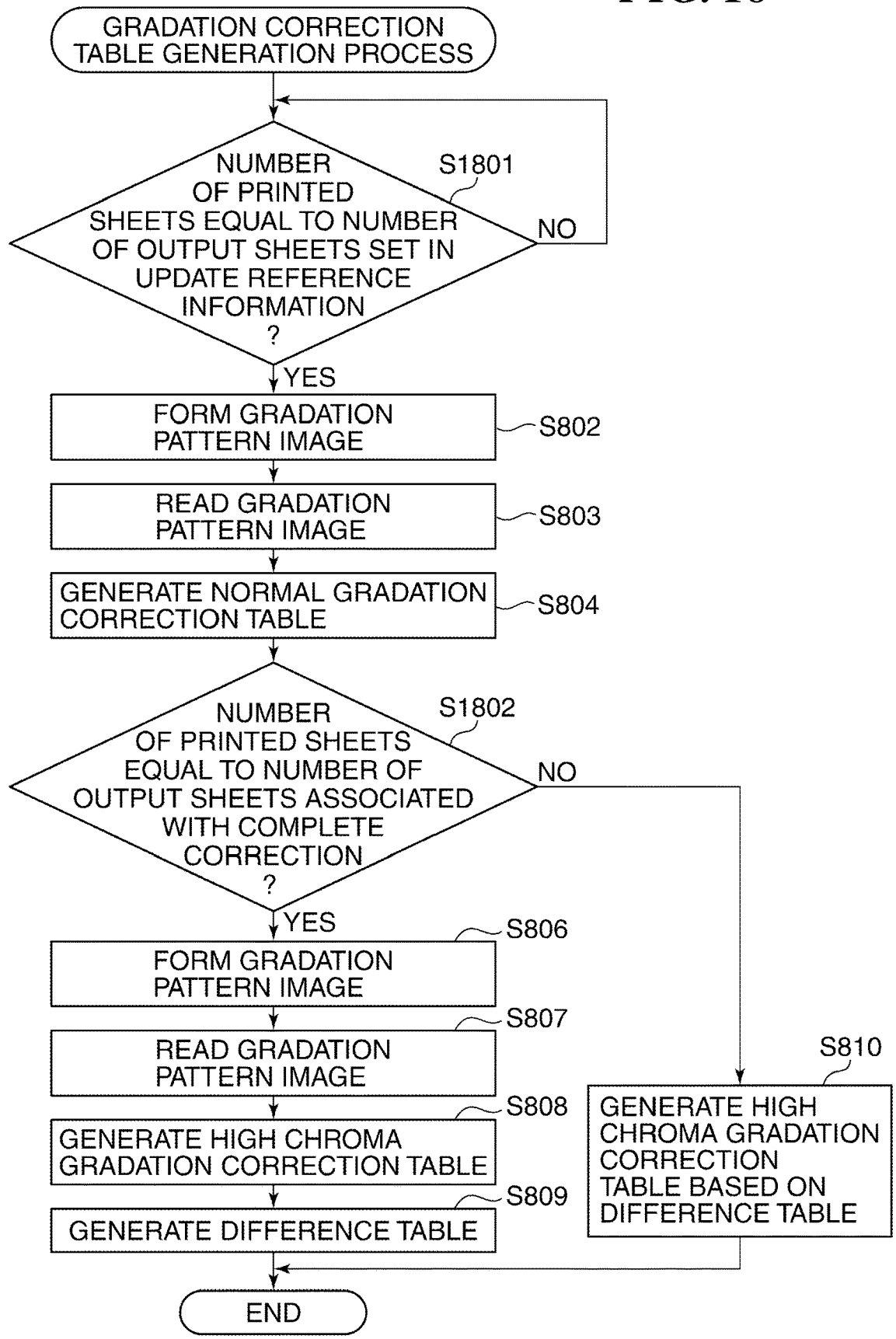
FIG. 18 is a flowchart of a variation of the gradation correction table generation process in FIG. 8.

FIG. 18 is a flowchart of a variation of the gradation correction table generation process in FIG. 8.

The gradation correction table generation process in FIG. 18 is performed by the CPU 101 that loads an associated program stored in the ROM 102 into the RAM 103 and executes the loaded program. Further, in the gradation correction table generation process in FIG. 18, when the number of printed sheets reaches a predetermined number based on update reference information 1900 shown in FIG. 19, one of the complete correction and the normal correction is performed according to the number of printed sheets. In the update reference information 1900, the number of output sheets as a condition for performing one of the complete correction and the normal correction is set, and for example, in a case where the number of output sheets is equal to "0", the complete correction is performed, and in a case where the number of output sheets is equal to "1500", the normal correction is performed.

Referring to FIG. 18, first, the CPU 101 counts the number of printed sheets, and waits until the number of printed sheets becomes equal to a number set in the update reference information 1900. If the number of printed sheets has become equal to any of the numbers of output sheets set in the update reference information 1900 (YES to a step S1801), the CPU 101 executes the steps S802 to S804. Then, the CPU 101 determines whether or not the number of printed sheets is equal to any of the numbers of output sheets associated with the complete correction (step S1802).

If it is determined in the step S1802 that the number of printed sheets is equal to any of the numbers of output sheets associated with the complete correction (YES to the step S1802), the CPU 101 executes the step S806 et seq.

If it is determined in the step S1802 that the number of printed sheets is not equal to any of the numbers f output sheets associated with the complete correction, but to any of the numbers of output sheets associated with the normal correction (NO to the step S1802), the CPU 101 executes the step S810 and following processing.

In the gradation correction table generation process in FIG. 18, which of the complete correction and the normal correction is to be performed is determined according to the number of sheets printed by the MFP 100. This makes it possible to periodically update the normal gradation correction table, the high chroma gradation correction table, and the difference table, which are used for gradation correction, without a user's instruction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-179014 filed Sep. 19, 2017, which is hereby incorporated by reference herein in its entirety.

What is claimed is:

1. An image forming apparatus that includes a photosensitive drum on which an electrostatic latent image is formed, and a developing roller which causes developer to attach to the photosensitive drum, and is capable of performing image formation in a first printing mode in which a peripheral speed ratio of the developing roller to the photosensitive drum is set to a predetermined peripheral speed ratio so as to form an image, and image formation in a second printing mode in which the peripheral speed ratio of the developing roller to the photosensitive drum is larger than the predetermined peripheral speed ratio, the image forming apparatus comprising:

one or more processors connected to one or more memories, the one or more processors being configured to operate as:

a difference data generation unit configured to generate difference data derived from first correction data and second correction data, the first correction data being generated by using a result of measurement of density of an image formed in the first printing mode, the second correction data being generated by using a result of measurement of density of an image formed in the second printing mode;

a first generation unit configured to generate third correction data for use in an image formation in the first printing mode, by using a result of measurement of density of the image formed in the first printing mode; and a second generation unit configured to generate fourth correction data for use in an image formation in the second printing mode, by using the third correction data generated by the first generation unit and the difference data.

2. The image forming apparatus according to claim 1, wherein the third correction data generated by the first generation unit is generated for each color component.

3. The image forming apparatus according to claim 1, wherein the fourth correction data generated by the second generation unit is generated for each color component.

4. The image forming apparatus according to claim 3, wherein the color component is any one of cyan, magenta, yellow, and black.

5. The image forming apparatus according to claim 1, wherein the number of printed sheets is counted, and
wherein generation of the first correction data and generation of the second correction data is performed, according to the counted number of printed sheets.

6. The image forming apparatus according to claim 1, wherein the photosensitive drum and the developing roller are driven for rotation, and
wherein the rotational speed of the photosensitive drum at the time of the image formation in the second printing mode is lower than the rotational speed of the photosensitive drum at the time of the image formation in the first printing mode.

7. A method of controlling an image forming apparatus that includes a photosensitive drum on which an electrostatic latent image is formed, and a developing roller which causes developer to attach to the photosensitive drum, and is capable of performing image formation in a first printing mode in which a peripheral speed ratio of the developing roller to the photosensitive drum is set to a predetermined peripheral speed ratio so as to form an image, and image formation in a second printing mode in which the peripheral speed ratio of the developing roller to the photosensitive drum is larger than the predetermined peripheral speed ratio, the method comprising:

generating difference data derived from first correction data and second correction data, the first correction data being generated by using a result of measurement of density of an image formed in the first printing mode, the second correction data being generated by using a result of measurement of density of an image formed in the second printing mode;

generating third correction data for use in an image formation in the first printing mode, by using a result of measurement of density of the image formed in the first printing mode; and generating fourth correction data for use in an image formation in the second printing mode, by using the third correction data and the difference data.

8. A non-transitory computer-readable storage medium storing a computer-executable program for executing a method of controlling an image forming apparatus that includes a photosensitive drum on which an electrostatic latent image is formed, and a developing roller which causes developer to attach to the photosensitive drum, and is capable of performing image formation in a first printing mode in which a peripheral speed ratio of the developing roller to the photosensitive drum is set to a predetermined peripheral speed ratio so as to form an image, and image formation in a second printing mode in which the peripheral speed ratio of the developing roller to the photosensitive drum is larger than the predetermined peripheral speed ratio,
wherein the method comprises:

generating difference data derived from first correction data and second correction data, the first correction data being generated by using a result of measurement of density of an image formed in the first printing mode, the second correction data being generated by using a result of measurement of density of an image formed in the second printing mode;

generating third correction data for use in an image formation in the first printing mode, by using a result of measurement of density of the image formed in the first printing mode; and generating fourth correction data for use in an image formation in the second printing mode, by using the third correction data and the difference data.

9. The image forming apparatus according to claim 1, wherein the difference data is generated for each color component.

10. The image forming apparatus according to claim 1, further comprising a density detector that reads a gradation pattern image formed on the photosensitive drum and detects a toner density of the gradation pattern image,
wherein the density detector reads a gradation pattern image formed on the photosensitive drum in the first printing mode, and the first correction data and the third correction data are generated based on the toner density detected by the density detector.

11. The image forming apparatus according to claim 1, further comprising a density detector that reads a gradation pattern image formed on the photosensitive drum and detects a toner density of the gradation pattern image,
wherein the density detector reads a gradation pattern image formed on the photosensitive drum in the second printing mode, and the second correction data is generated based on the toner density detected by the density detector.

12. The image forming apparatus according to claim 5, wherein generation of the difference data is performed, according to the counted number of printed sheets.

13. The method according to claim 7, wherein the third correction data is generated for each color component.

14. The method according to claim 7, wherein the fourth correction data is generated for each color component.

15. The method according to claim 14, wherein the color component is any one of cyan, magenta, yellow, and black.

16. The method according to claim 7, wherein the number of printed sheets is counted, and wherein generation of the first correction data and generation of the second correction data is performed, according to the counted number of printed sheets.

17. The method according to claim 7, wherein the photosensitive drum and the developing roller are driven for rotation, and wherein the rotational speed of the photosensitive drum at the time of the image formation in the second printing mode is lower than the rotational speed of the photosensitive drum at the time of the image formation in the first printing mode.

18. The method according to claim 7, wherein the difference data is generated for each color component.

19. The method according to claim 7, further comprising:
reading a gradation pattern image formed on the photosensitive drum and detecting a toner density of the gradation pattern image, by a density detector,
wherein the density detector reads a gradation pattern image formed on the photosensitive drum in the first printing mode, and the first correction data and the third correction data are generated based on the toner density detected by the density detector.

20. The method according to claim 7, further comprising:
reading a gradation pattern image formed on the photosensitive drum and detecting a toner density of the gradation pattern image, by a density detector,
wherein the density detector reads a gradation pattern image formed on the photosensitive drum in the second printing mode, and the second correction data is generated based on the toner density detected by the density detector.

21. The method according to claim 16,
wherein generation of the difference data is performed, according to the counted number of printed sheets.

\* \* \* \* \*